United States Patent [19]

Shigemori et al.

[11] Patent Number: 5,740,079

[45] Date of Patent: Apr. 14, 1998

[54] METHOD FOR DETERMINING COLORIMETRIC VALUE

[75] Inventors: Yoshihiro Shigemori, Koshigaya; Kazuo Sano, Tokyo; Tomio Saito, Tokyo; Fumiyoshi Saito, Tokyo; Tomiko Yoshida, Abiko, all of Japan

[73] Assignee: Dainichiseika Color & Chemicals Mfg. Co., Ltd., Tokyo, Japan

[21] Appl. No.: 614,467

[22] Filed: Mar. 12, 1996

[30] Foreign Application Priority Data

Mar. 13, 1995 [JP] Japan ................ 7-080680
Mar. 13, 1995 [JP] Japan ................ 7-080681

[51] Int. Cl.⁶ ................................................ G01J 3/46
[52] U.S. Cl. .................... 364/526; 356/402; 356/407; 356/408; 356/425
[58] Field of Search ................ 364/526; 356/402, 356/326, 405, 419, 407, 409, 425, 414, 446, 375

[56] References Cited

U.S. PATENT DOCUMENTS

| | | | |
|---|---|---|---|
| 4,403,866 | 9/1983 | Falcoff et al. | 366/132 |
| 4,832,491 | 5/1989 | Sharpe et al. | 356/326 |
| 5,015,098 | 5/1991 | Berg et al. | 356/402 |
| 5,082,529 | 1/1992 | Burk | 162/198 |
| 5,272,518 | 12/1993 | Vincent | 356/405 |
| 5,530,563 | 6/1996 | Zimmermann et al. | 358/517 |
| 5,559,173 | 9/1996 | Campo et al. | 523/303 |
| 5,559,604 | 9/1996 | Arai | 356/402 |
| 5,592,294 | 1/1997 | Ota et al. | 356/402 |

*Primary Examiner*—James P. Trammell
*Assistant Examiner*—Demetra R. Smith
*Attorney, Agent, or Firm*—Flynn, Thiel, Boutell & Tanis, P.C.

[57] ABSTRACT

The colorimetric value at a specified temperature is determined by measuring the colorimetric value of a colored material sample at an arbitrary temperature using a color meter such as a spectrophotometer, colorimeter, or densitometer, and by correcting the measured colorimetric value on the basis of the change in colorimetric value with temperature, which change in colorimetric value is computed from the difference in colorimetric values observed for a single colored material sample at a minimum of two different temperatures. When a spectrophotometer is applied, the spectral reflectance or the spectral transmittance of the colored material sample is measured. On the other hand, spectral reflectance or spectral transmittance is measured in advance for a dye or pigment at a minimum of two different temperatures. The difference ($\Delta K$) of absorption coefficient ($K$), the difference ($\Delta S$) in the scattering coefficient ($S$), and the difference ($\Delta D$) in absorbance ($D$) at each wavelength are computed from the preliminarily observed spectral reflectance or spectral transmittance. The spectral transmittance or spectral reflectance observed at an arbitrary temperature is corrected to define the colorimetric value at a specified temperature using the obtained values of $K$, $S$, and $D$.

8 Claims, No Drawings

METHOD FOR DETERMINING COLORIMETRIC VALUE

FIELD OF THE INVENTION

The present invention relates to a method for correcting the colorimetric value of various colored materials, more particularly to a method for determining colorimetric value by correcting an observational difference caused by temperature changes to assure a sustained high accuracy when measuring colorimetric value.

BACKGROUND OF THE INVENTION

Control of the color of colored products has up to now mainly been accomplished by a method using digitized colorimetric values (hereinafter referred to simply as "colorimetric value") such as L*, a*, b*, which conform to the CIE standard colorimetric system, and the Munsell value, which conforms to the Munsell color system. The obtained colorimetric values, however, have the disadvantage of fluctuations thereof depending on the temperature at which the measurement was taken, and thus generate an error. To compensate for this, a method has long been applied whereby colorimetric values are observed under the same temperature conditions, or the observed colorimetric values are compared against a value measured on a standard sample for every measurement.

Generally, the change in colorimetric value with temperature gives a color difference ($\Delta E^*$) error ranging from about 0.1 to about 0.3 per 1° C. of temperature change. Consequently, when greater accuracy of determination is required, measurements must be conducted while maintaining the sample temperature to within 1° C. Control of the sample temperature to within an accuracy of 1° C. for every measurement operation requires dependency on expensive equipment and complex procedures. Therefore, the usual alternative method is to measure the colorimetric value for both the standard sample and for the target sample at the same time, to remove the effects of errors generated by temperature change as much as possible.

The additional measurement of colorimetric value for the standard sample requires painstaking process control and preventive measures to be taken against discoloration and contamination over the long period of storage of the standard sample. Since materials which degrade during the storage period and discolor cannot be used as the standard sample, a material resistant to this kind of degradation needs to be separately prepared for every measurement cycle.

Furthermore, when, for example, a product is continuously produced in a commercial production line, a product for the outdoors, or a building structure is the target of colorimetric value determination, it is impossible to make measurements under completely static temperature conditions. For these types of colorimetric value determinations, a colorimetric value containing an error has to be used in many cases.

SUMMARY OF THE INVENTION

The inventors performed an investigation on the correlation between the temperature of colored materials and their colorimetric values to clarify the detail of temperature dependency of colorimetric values. Through the investigation, the inventors found that the change in temperature and the change of colorimetric value are closely correlated, and proved that any colorimetric value measured under arbitrary temperature conditions can be corrected to a colorimetric value at a specified temperature by utilizing the phenomenon of changing colorimetric value depending on temperature.

The present invention was completed on the basis of the findings described above. One object of the present invention is to provide a method to determine colorimetric values reliably and highly accurately without any accompanying observation error caused by a temperature change under arbitrary temperature conditions.

Another object of the invention is to provide a method to determine colorimetric values effective for process control with a simple operation.

A further object of the invention is to provide a method to determine colorimetric values which allow the estimation of correct mixing rate of dye or pigment in color-matching operation at arbitrary temperatures.

To achieve the objects of the invention, the method of the invention to determine the colorimetric value of a colored material measures the colorimetric value of a colored material sample at an arbitrary temperature using a color meter, and corrects the measured colorimetric value on the basis of the change in colorimetric value resulting from a temperature difference to determine the colorimetric value at a specified temperature, whereby the change in colorimetric value is computed from the difference in colorimetric values measured on a single colored sample at a minimum of two different temperatures.

One mode of the present invention uses a spectrophotometer or a colorimeter as the color meter to measure the spectral reflectance or color value, to compute the change of spectral reflectance or color value per unit temperature range based on the difference in spectral reflectance or color value observed under two different temperature conditions, and to correct the spectral reflectance or color value based on the determined change to derive the colorimetric value at a specified temperature.

Another mode of the present invention uses a spectrophotometer as the color meter to measure the spectral reflectance, and to correct the measured spectral reflectance by the equations for mixed color mentioned below on the basis of the difference ($\Delta K$, $\Delta S$) of absorption coefficient ($K$) and scattering coefficient ($S$) at each wavelength to determine the colorimetric value at a specified temperature, whereby the values of difference ($K$, $S$) are computed in advance from the spectral reflectance observed for a material colored by a dye or pigment at a minimum of two different temperatures.

A further mode of the present invention uses a spectrophotometer as the color meter to measure the spectral transmittance, and to correct the measured spectral transmittance by the equations for mixed color mentioned below on the basis of the difference ($\Delta D$) of absorbance ($D$) at each wavelength to determine the colorimetric value at a specified temperature, whereby the difference in absorbance ($D$) is computed from the spectral transmittance observed for a material colored by a base dye or pigment at a minimum of two different temperatures.

DETAILED DESCRIPTION OF THE PREFERRED EMBODIMENTS

The color meter used in the present invention is a spectrophotometer, colorimeter, a densitometer, etc. The change, which is the correction factor in the present invention, is given as the difference in colorimetric value measured on a standard colored sample under at least two temperature conditions. The standard colored sample is not necessarily a specific colored material, and it may be a plastic material colored by various kinds of dyes or pigments, or a metallic material with color coating. In specific terms, the colorimetric values of a colored sample are measured at two arbitrary temperatures, for example, at 30° C. and 50° C. The difference between these measured colorimetric values is converted to the change per specific temperature range, which change is then used as the correction factor. In the preferred embodiment, the change is preferably the change per 1° C.

The measurement operation of colorimetric value may be carried out by providing a built-in temperature sensor to equipment such as a spectrophotometer, colorimeter, or densitometer to detect the measurement temperature, and may be implemented by entering a specified temperature via the keyboard of the computer. The process control is simplified if the colorimetric values of target samples measured at arbitrary temperature levels are converted into data at specific temperature levels and if the converted data are stored as a database.

The present invention was completed as a color determination method suitable for an industrial control technique by utilizing the correlation between colorimetric value and temperature and by correcting the colorimetric value measured at an arbitrary temperature to one at a specified temperature. That is, according to the present invention the difference in measured colorimetric values of a colored sample at a minimum of two different temperatures, or the amount of change, is determined as the correction factor per unit temperature range. A colorimetric value of the target material sample is then measured at an arbitrary temperature and converted to the colorimetric value at the target temperature using the correction factor. Thus, the observation error caused by the temperature change is effectively eliminated.

Consequently, a simple operation allows the reliable and accurate determination of colorimetric value, and allows the simulation of the colorimetric value at any arbitrary temperature. The method of the present invention is highly effective as a daily control of colorimetric value determination.

A spectrophotometer or a colorimeter is used as the color meter to measure the spectral reflectance or color value, to compute their change per unit temperature range based on the difference in spectral reflectance or color value observed at two different temperature conditions, and to correct the spectral reflectance or color value based on the determined change to derive the colorimetric value at a specified temperature.

According to the present invention, the spectral reflectance for a mixed color material can be calculated by the theory of Kubelka Munk and the theory of Duncan, which are given below. That is, the spectral reflectance of a material is expressed by the function of the absorption coefficient and scattering coefficient in eq.(1) derived from the theory of Kubelka Munk.

$$R=1+K/S-\{(K/S)^2+2(K/S)\}^{1/2} \quad (1)$$

where R denotes the reflectance at each wavelength, K denotes the absorption coefficient at each wavelength, and S denotes the scattering coefficient at each wavelength.

When a dye or pigment consists of a mixture of several components and when the surface covering power is strong, as observed in paint, K/S is expressed by modifying eq.(1) to Duncan's eq.(2).

$$K/S=(\Sigma KiCi+Ko)/(\Sigma SiCi+So) \quad (2)$$

where Ki denotes the absorption coefficient of each color material, Si denotes the scattering coefficient of each color material, Ko denotes the absorption coefficient of the medium, So denotes the scattering coefficient of the medium and Ci denotes the mixing rate of each color material.

On the other hand, the value of K/S for the case of a material with a primary coating, which is experienced in printed matter, is expressed by eq.(3).

$$K/S=\Sigma \epsilon iCi+(K/S)o \quad (3)$$

where $\epsilon i$ denotes the value of K/S per unit of color material, Ci denotes the mixing rate of each color material, and (K/S)o denotes the value of K/S of the primary coating.

In the case of transparent material, the transmittance (T) of each material colored by the dye or pigment leads the absorbance (D) using the theory of Lambert Beer expressed as eq. (4) and eq. (5).

$$T=10^{-D} \quad (4)$$

$$D=\Sigma DiCi+Do \quad (5)$$

where, Di denotes the absorbance per unit of color material, Ci denotes the mixing rate of each color material, and Do denotes the absorbance of the medium.

For example, the change in spectral reflectance and transmittance per 1° C. allows the computation of the change of absorbance and scattering coefficient for each dye or pigment, or conversely, the change in spectral transmittance allows the computation of the change of absorbance. This means that, the observed value of spectral reflectance and transmittance of a mixed color sample at an arbitrary temperature can be corrected using the computed change as the correction factor to eliminate the effect of temperature conditions.

According to the invention, the change used as the correction factor is given as the difference between the absorption coefficient (K) and the scattering coefficient (S) at each wavelength, which are determined from spectral reflectance observed at a minimum of two different temperatures of a dye or pigment, or given as the difference in absorbance at each wavelength, which is derived from spectral transmittance (T) observed at a minimum of two different temperatures for a dye or pigment. In that case, the change in correction factor is preferably the difference per 1° C., and the computation of the correction factor is automatically conducted using the CCM method.

The dye or pigment applied to the present invention is not specifically limited, and it may consist of various kinds of materials such as plastics which are colored by a single or mixed dye or pigment, and metallic materials. Examples of dyes are the anthraquinone group, the heterocyclic group, the methine group, the perynone group, and the perylene group. Examples of pigments are inorganic compounds such as titanium oxide, carbon black, the iron oxide group, and the ultramarine group, and organic compounds such as the azo group, copper phthalocyanine group, the perynone group, the perylene group, the quinacridone group, and the pyrrole group.

For example, a sample is prepared by coloring a hard polyvinyl chloride resin with a pigment of yellow lead pigment (with addition of 1 phr). The spectral reflectance is measured at 29° C. and at 60° C. using a spectrophotometer. Then, the absorption coefficient (K) and the scattering coefficient (S) are computed at wavelength intervals of 10 nm. When the difference ($\Delta K$, $\Delta S$) per 1° C. for each wavelength is derived from the computed K and S, the values listed in Column "b" of Table 1 are obtained. Next, for the observed values at 29° C., the absorption coefficient (K) and scattering coefficient (S) for each wavelength at 25° C. are corrected at each wavelength using the correction factors ΔK and ΔS, and the estimation values listed in Column "a" of Table 1 are obtained. That is, when 25° C. is taken as the standard temperature of measurement, the absorption coefficient and the scattering coefficient of a material colored by a yellow lead pigment at the standard temperature are readily derived. Following the same procedure, the case of polyazo yellow as the pigment is expressed in Table 2.

Other dyes and pigments are treated using the same procedure. That is, the absorption coefficient (K), scattering coefficient (S), and absorbance (D) at 25° C. are determined using the computed changes (ΔK, ΔS, and ΔD) at each wavelength per 1° C. as the correction factors. These determined values are entered along with the correction factors (ΔK, ΔS, and ΔD) into a computer to store as the database. In this way, color is brought under numerical control.

The method of measurement includes the correction of observed spectral reflectance and transmittance for a target color sample at an arbitrary temperature, and the conversion of the corrected values into corresponding Munsell values on the basis of JIS Z8729 "Method of Color Specification using L*, a*, b* system and L*, u*, v* system" and the Attached Table 1 "Standard of Color Atlas using Three Color Qualities" in JIS Z8721 "Color Display on the basis of Three Color Qualities".

The above-described method of measurement may be implemented by mounting temperature sensors in the spectrophotometer, colorimeter, densitometer or other peripheral devices and providing a computation circuit to sense the target temperature, and it is possible to automatically generate colorimetric values at a standard temperature, and it is also possible to enter a specific temperature for practical application through the keyboard of the computer to a system comprising a separately located color meter, temperature sensor, and calculator.

The present invention was completed by adopting a method of correction and conversion of a measured spectral reflectance and transmittance at an arbitrary temperature into values at a specified wavelength at specific temperature using the intrinsic correlation between the spectral reflectance and transmittance and the temperature of a material colored by a dye or pigment. The derived invention is a suitable color control method for use in industrial control. If the blending ratio is not specified and a database of correction factors of dye or pigment is not available, the blending ratio is obtained by determining the colorimetric value of the sample at two different temperature levels and by converting these values to the value at a standard temperature. On the other hand, if the database of correction factors of the material colored by the dye or pigment is available, the colorimetric value of the sample is determined at a single temperature level, and the value is converted to the value at a standard temperature.

The subject to be determined by the present invention may be paint and ink mixed with a dye or pigment or plastics, fiber, and paper colored by paint and ink, or other colored materials found in nature. The method for determining colorimetric value in the present invention can be effectively applied to control hue in computer color matching (CCM).

TABLE 1

| Wavelength (nm) | "a" Column (value estimated at 25° C.) | | "b" Column (change per 1° C.) | |
|---|---|---|---|---|
| | K | S | ΔK | ΔS |
| 380 | 3.29002 | 0.92676 | −0.000469 | 0.003283 |
| 390 | 3.11278 | 1.15303 | 0.000996 | −0.000508 |
| 400 | 2.95694 | 0.83849 | 0.002118 | −0.000719 |
| 410 | 3.02632 | 0.89754 | 0.001617 | −0.000293 |
| 420 | 3.09738 | 0.85726 | 0.001076 | −0.000591 |
| 430 | 3.17634 | 0.85442 | 0.000888 | −0.000519 |
| 440 | 3.19967 | 0.84830 | 0.001118 | −0.000518 |
| 450 | 3.17526 | 0.84722 | 0.000791 | −0.000355 |
| 460 | 3.11191 | 0.84653 | 0.000566 | −0.000261 |
| 470 | 3.04310 | 0.84621 | 0.001090 | −0.000385 |
| 480 | 2.93735 | 0.85656 | 0.001180 | −0.000418 |
| 490 | 2.77874 | 0.88700 | 0.000917 | −0.000429 |
| 500 | 2.49862 | 0.89904 | 0.001764 | −0.000489 |
| 510 | 1.72013 | 0.85543 | 0.005676 | −0.000340 |
| 520 | 0.77998 | 0.75975 | 0.006831 | −0.000306 |
| 530 | 0.28473 | 0.70877 | 0.003771 | −0.000500 |
| 540 | 0.11522 | 0.66600 | 0.001547 | −0.000757 |
| 550 | 0.06075 | 0.63866 | 0.000576 | −0.000530 |
| 560 | 0.03880 | 0.62649 | 0.000226 | −0.000320 |
| 570 | 0.02750 | 0.61683 | 0.000096 | −0.000127 |
| 580 | 0.02229 | 0.60102 | 0.000042 | −0.000037 |
| 590 | 0.01981 | 0.59075 | 0.000018 | −0.000023 |
| 600 | 0.01825 | 0.56338 | 0.000010 | 0.000160 |
| 610 | 0.01712 | 0.56806 | 0.000005 | −0.000243 |
| 620 | 0.01625 | 0.56093 | 0.000005 | −0.000162 |
| 630 | 0.01538 | 0.55786 | 0.000005 | −0.000089 |
| 640 | 0.01472 | 0.56209 | 0.000004 | −0.000234 |
| 650 | 0.01408 | 0.55564 | 0.000005 | −0.000592 |
| 660 | 0.01379 | 0.53055 | 0.000003 | −0.000267 |
| 670 | 0.01389 | 0.52536 | 0.000003 | −0.000283 |
| 680 | 0.01399 | 0.52039 | 0.000002 | −0.000301 |
| 690 | 0.01362 | 0.49605 | 0.000000 | −0.000369 |
| 700 | 0.01325 | 0.47175 | −0.000002 | −0.000453 |

TABLE 2

| Wavelength (nm) | "a" Column (value estimated at 25° C.) | | "b" Column (change per 1° C.) | |
|---|---|---|---|---|
| | K | S | ΔK | ΔS |
| 380 | 3.61180 | 3.57644 | −0.000632 | −0.004358 |
| 390 | 3.36768 | 4.65334 | 0.000751 | −0.003614 |
| 400 | 3.16364 | 3.55484 | 0.001811 | −0.001690 |
| 410 | 3.18842 | 3.94067 | 0.001361 | −0.000657 |
| 420 | 3.21256 | 3.95203 | 0.000910 | −0.002441 |
| 430 | 3.25457 | 3.87999 | 0.000227 | −0.002544 |
| 440 | 3.21325 | 3.69975 | 0.000900 | −0.003551 |
| 450 | 3.13895 | 3.40270 | 0.000577 | −0.003600 |
| 460 | 3.00381 | 2.96234 | 0.000528 | −0.003492 |
| 470 | 2.88586 | 2.41565 | 0.000329 | −0.002842 |
| 480 | 2.67385 | 1.92838 | −0.000142 | −0.002313 |
| 490 | 2.35882 | 1.45787 | −0.000228 | −0.001917 |
| 500 | 1.87664 | 1.01748 | 0.000289 | −0.001277 |
| 510 | 1.31689 | 0.65396 | 0.001000 | −0.000536 |
| 520 | 0.78470 | 0.42351 | 0.001643 | −0.000213 |
| 530 | 0.39371 | 0.31297 | 0.001519 | −0.000159 |
| 540 | 0.18817 | 0.24889 | 0.000969 | 0.000009 |
| 550 | 0.10335 | 0.22169 | 0.000458 | 0.000020 |
| 560 | 0.07404 | 0.22753 | 0.000182 | 0.000035 |
| 570 | 0.06403 | 0.21840 | 0.000065 | 0.000355 |
| 580 | 0.06193 | 0.17918 | 0.000019 | 0.000897 |
| 590 | 0.06300 | 0.12984 | 0.000004 | 0.001210 |
| 600 | 0.06512 | 0.13313 | 0.000005 | 0.001081 |
| 610 | 0.06789 | 0.10360 | 0.000003 | 0.001144 |
| 620 | 0.07170 | 0.04728 | 0.000000 | 0.001253 |
| 630 | 0.07197 | 0.05167 | 0.000123 | −0.000419 |
| 640 | 0.07738 | 0.05620 | 0.000547 | −0.001550 |
| 650 | 0.08470 | 0.05486 | 0.000150 | −0.001215 |
| 660 | 0.08881 | 0.05341 | 0.000199 | −0.000852 |
| 670 | 0.10393 | 0.04869 | 0.000001 | 0.000328 |

TABLE 2-continued

| Wavelength (nm) | "a" Column (value estimated at 25° C.) | | "b" Column (change per 1° C.) | |
|---|---|---|---|---|
| | K | S | ΔK | ΔS |
| 680 | 0.11254 | 0.04454 | 0.000030 | 0.001365 |
| 690 | 0.11922 | 0.04758 | 0.000010 | 0.000605 |
| 700 | 0.09037 | 0.05053 | 0.001018 | -0.000133 |

EXAMPLE

The present invention is described in more detail referring to examples and comparative examples. Nevertheless, the invention is not limited to the content of the examples.

Example 1

Color No. P29-1 10 in the Standard Color Sample Book for Paints (Wide Edition) issued by the Japan Paint Industrial Association (P edition, 1989) was selected as the standard colored sample. The spectral reflectance of the sample was measured at the sample temperatures of 10° C. and 40° C. within a wavelength range of from 380 nm to 700 nm at wavelength intervals of 10 nm using a spectrophotometer (Column C; made by Dainippon Seika Kogyo Co., Ltd.). Based on these observed values, the change (ΔR) per 1° C. at each wavelength was computed from the difference in spectral reflectance at a 30° C. temperature difference. The result is shown in Table 3.

TABLE 3

| Wavelength (nm) | Change (ΔR) | Wavelength (nm) | Change (ΔR) |
|---|---|---|---|
| 380 | -0.000015 | 550 | 0.000040 |
| 390 | -0.000118 | 560 | 0.000130 |
| 400 | -0.000095 | 570 | -0.000455 |
| 410 | -0.000015 | 580 | -0.000745 |
| 420 | 0.000050 | 590 | -0.000805 |
| 430 | 0.000030 | 600 | -0.000660 |
| 440 | 0.000020 | 610 | -0.000435 |
| 450 | 0.000025 | 620 | -0.000240 |
| 460 | 0.000010 | 630 | -0.000110 |
| 470 | 0.000030 | 640 | -0.000075 |
| 480 | 0.000030 | 650 | -0.000030 |
| 490 | 0.000030 | 660 | -0.000030 |
| 500 | 0.000000 | 670 | -0.000038 |
| 510 | -0.000115 | 680 | -0.000055 |
| 520 | -0.000090 | 690 | -0.000084 |
| 530 | 0.000010 | 700 | -0.000125 |
| 540 | 0.000070 | | |

Next, the colored sample as the target material was measured to obtain its spectral reflectance under the temperature conditions of 10° C., 20° C., and 30° C. using the same spectrophotometer. The change (ΔR) shown in Table 3 was used as the correction factor to compute the estimated reflectance at 20° C. from the observed values at 10° C. and 30° C. The Munsell value was when computed from the estimated reflectance. The result is given in Table 4. Table 4 also shows the color difference (ΔE) from the Munsell value at 10° C. and 30° C. on the basis of the Munsell value observed at 20° C.

TABLE 4

| Standard colored sample | Observation temperature (°C.) | Converted Munsell number | Color difference (ΔE) |
|---|---|---|---|
| Color sample: P2 9-110 | 10 | 2.26Y 6.86/6.29 | 0.06 |
| | 20 | 2.24Y 6.85/6.29 | Standard |
| | 30 | 2.24Y 6.85/6.29 | 0.06 |

The table indicates that the Munsell values corresponding to the temperature change are limited to a range of very slight dispersion and that the values are derived as high precision observed values.

Examples 2-5

Four colors were selected as standard colored samples from the Standard Color Sample Book for Paints (Wide Edition) issued by the Japan Paint Industrial Association (P edition in 1989). The Munsell values were computed by correction-conversion of the observed spectral reflectance of the colored sample in a similar manner to that applied in Example 1. The result is shown in Table 5. Table 5 indicates that the color difference (ΔE) caused by temperature change is very small and independent of the difference in hue.

TABLE 5

| Example No. | Standard colored sample (color sample) | Observation temperature (°C.) | Converted Munsell value | Color difference (ΔE) |
|---|---|---|---|---|
| Example 2 | P14 - 204 | 10 | 2.15Y 7.65/12.68 | 0.09 |
| | | 20 | 2.17Y 7.65/12.66 | Standard |
| | | 30 | 2.15Y 7.65/12.68 | 0.09 |
| Example 3 | P31 - 308 | 10 | 2.33Y 8.67/4.06 | 0.03 |
| | | 20 | 2.35Y 8.67/4.06 | Standard |
| | | 30 | 2.33Y 8.67/4.06 | 0.03 |
| Example 4 | P6 - 342 | 10 | 9.67GY 6.02/6.12 | 0.02 |
| | | 20 | 9.68GY 6.02/6.12 | Standard |
| | | 30 | 9.67GY 6.02/6.12 | 0.02 |
| Example 5 | P16 - 413 | 10 | 1.07PB 4.87/10.64 | 0.11 |
| | | 20 | 1.09PB 4.87/10.66 | Standard |
| | | 30 | 1.07PB 4.87/10.64 | 0.11 |

Comparative Examples 1-4

Four colors were selected as standard colored samples from the Standard Color Sample Book for Paints (Wide Edition) issued by the Japan Paint Industrial Association (P edition in 1989). Their spectral reflectance at the sample temperature levels of 10° C., 20° C., and 30° C. was measured. The Munsell values were computed directly from the observed values. Table 6 shows the obtained Munsell values and the color difference (ΔE). Table 6 indicates that the color difference (ΔE) is considerably dispersed compared with the corresponding examples (refer to Table 5).

TABLE 6

| Example No. | Standard colored sample (color sample) | Observation temperature (°C.) | Converted Munsell value | Color difference (ΔE) |
|---|---|---|---|---|
| Comparative Example 1 | P14 - 204 | 10 | 2.38Y 7.67/12.68 | 0.78 |
| | | 20 | 2.17Y 7.65/12.66 | Standard |

TABLE 6-continued

| Example No. | Standard colored sample (color sample) | Observation temperature (°C.) | Converted Munsell value | Color difference (ΔE) |
|---|---|---|---|---|
| | | 30 | 1.92Y 7.62/12.71 | 0.89 |
| Comparative Example 2 | P31 - 308 | 10 | 2.49Y 8.67/4.07 | 0.28 |
| | | 20 | 2.35Y 8.67/4.06 | Standard |
| | | 30 | 2.16Y 8.66/4.06 | 0.35 |
| Comparative Example 3 | P6 - 342 | 10 | 9.67GY 6.02/6.12 | 0.38 |
| | | 20 | 9.68GY 6.02/6.12 | Standard |
| | | 30 | 9.58GY 6.02/6.06 | 0.41 |
| Comparative Example 4 | P16 - 413 | 10 | 1.12PB 4.86/10.67 | 0.15 |
| | | 20 | 1.09PB 4.87/10.66 | Standard |
| | | 30 | 1.01PB 4.86/10.62 | 0.36 |

Example 6

Formed colored plastic plates were prepared by blending pigment of the same hue as that in Example 1 into a polyethylene resin. The colorimetric value was determined in a similar manner to Example 1. The obtained result is given in Table 7.

TABLE 7

| Standard colored sample | Observation temperature (°C.) | Converted Munsell value | Color difference (ΔE) |
|---|---|---|---|
| Resin plate having the | 10 | 2.34Y 7.71/12.25 | 0.07 |
| same pigment blend | 20 | 2.36Y 7.71/12.24 | Standard |
| with Example 1 | 30 | 2.35Y 7.71/12.25 | 0.08 |

Table 7 indicates that a formed plastic plate colored with a dye or pigment also provides industrial accuracy as in the case of coated plate in Example 1 and that the present invention is effectively applicable independent of the kind of colored material.

Examples 7–12, Comparative Examples 5–10

Four samples of colored polyvinyl chloride plate (PVC: 100, stabilizer: 3 lubricant: 1) having 1 mm of thickness, had spectral reflectances measured under the temperature conditions of 25° C., 40° C., and 50° C. From the observed reflectance at 25° C., the values of L*, a*, and b* were computed. Then, the change per 1° C. was computed from the observed reflectance values at 40° C. and at 50° C., and the estimated reflectance at 25° C. was determined from the observed reflectance at 40° C. and at 50° C., and the values of L, a*, and b* were computed. Table 8 shows the result. The top row gives the values of L, a*, and b* determined from the observed reflectance at 25° C., and the lower rows give the corrected and converted values of L, a*, and b* along with the color difference (ΔE*) against the standard value in the top row.

For comparison, Table 9 shows the L, a*, and b* values computed from the spectral reflectance observed at 25° C., 40° C. and 50° C. and the color difference (ΔE*) at 40° C. and at 50° C. against the standard value of 25° C. Comparison of Table 8 with Table 9 clearly shows that the corrected color difference (ΔE*) in the Examples are reduced to an approximate range of from one third to one fifteenth as compared with the color difference before correction.

TABLE 8

| Example No. | Observation temperature (°C.) | L* | a* | b* | Color difference (ΔE) |
|---|---|---|---|---|---|
| Example 7 | 25 | 63.61 | 42.74 | 47.83 | Standard |
| | 40 | 63.52 | 42.61 | 47.80 | 0.16 |
| | 50 | 63.55 | 42.62 | 47.82 | 0.13 |
| Example 8 | 25 | 63.35 | 34.63 | 32.16 | Standard |
| | 40 | 63.32 | 34.53 | 32.14 | 0.11 |
| | 50 | 63.29 | 34.52 | 32.12 | 0.13 |
| Example 9 | 25 | 61.57 | 22.98 | 23.41 | Standard |
| | 40 | 61.45 | 23.04 | 23.32 | 0.16 |
| | 50 | 61.49 | 23.01 | 23.35 | 0.10 |
| Example 10 | 25 | 69.37 | 32.11 | 47.57 | Standard |
| | 40 | 69.43 | 32.15 | 47.48 | 0.12 |
| | 50 | 69.39 | 32.11 | 47.49 | 0.08 |
| Example 11 | 25 | 62.76 | 45.13 | 42.97 | Standard |
| | 40 | 62.65 | 44.98 | 42.92 | 0.19 |
| | 50 | 62.67 | 45.11 | 42.94 | 0.10 |
| Example 12 | 25 | 64.04 | 36.07 | 12.53 | Standard |
| | 40 | 63.95 | 35.95 | 12.54 | 0.15 |
| | 50 | 63.93 | 35.96 | 11.51 | 0.16 |

TABLE 9

| Example No. | Observation temperature (°C.) | L* | a* | b* | Color difference (ΔE) |
|---|---|---|---|---|---|
| Comparative Example 5 | 25 | 63.61 | 42.74 | 47.83 | Standard |
| | 40 | 63.22 | 42.78 | 47.37 | 0.60 Observed value at 40° C. |
| | 50 | 62.96 | 42.71 | 46.94 | 1.10 Observed value at 40° C. |
| Comparative Example 6 | 25 | 63.35 | 34.63 | 32.16 | Standard |
| | 40 | 63.02 | 34.42 | 31.65 | 0.64 |
| | 50 | 62.86 | 34.26 | 31.31 | 1.05 |
| Comparative Example 7 | 25 | 61.57 | 22.98 | 23.41 | Standard |
| | 40 | 61.39 | 23.74 | 23.47 | 0.78 |
| | 50 | 61.30 | 24.14 | 23.28 | 1.20 |
| Comparative Example 8 | 25 | 69.37 | 32.11 | 47.57 | Standard |
| | 40 | 69.42 | 31.75 | 47.30 | 0.45 |
| | 50 | 69.43 | 31.14 | 46.97 | 1.14 |
| Comparative Example 9 | 25 | 62.76 | 45.13 | 42.97 | Standard |
| | 40 | 62.42 | 44.83 | 42.23 | 0.87 |
| | 50 | 62.16 | 44.66 | 41.72 | 1.46 |
| Comparative Example 10 | 25 | 64.04 | 36.07 | 12.53 | Standard |
| | 40 | 63.85 | 35.41 | 12.10 | 0.81 |
| | 50 | 63.73 | 35.00 | 11.77 | 1.35 |

Comparative Examples 11–18

Sample sheets of polyvinyl chloride (PVC: 100, stabilizer: 3, lubricant: 1) having 1 mm of thickness and colored by various compositions of pigments listed in Table 10 were prepared. The spectral reflectance at 25° C., 40° C., and 50° C. was measured using a spectro-photometer (column C; made by Dainippon Seika Kogyo Co., Ltd.). The colorimetric value in the CIE (L*, a*, b*) color system was computed for each of the observed spectral emittance. The result is shown in Table 11 in relation to the corresponding pigment No. The color difference (ΔE) at 40° C. and 50° C. was determined on the basis of the observed value at 25° C., which is also given in Table 11.

TABLE 10

| Pigment No. Base pigment and its mixing rate* | 1 | 2 | 3 | 4 | 5 | 6 | 7 | 8 |
|---|---|---|---|---|---|---|---|---|
| Titanium white | 1.00 | 1.00 | 1.00 | 1.00 | 1.00 | 1.00 | 1.00 | 1.00 |
| Yellow lead | 0.40 | 0.40 | 0.40 | 0.40 | — | — | — | — |
| Polyazo yellow | — | — | — | — | 0.03 | — | 0.03 | 0.03 |
| Chromium vermilion | 0.40 | — | — | — | 0.40 | — | — | — |
| Watchung Red | — | 0.30 | — | — | — | 0.30 | — | — |
| Copper phthal-ocyanine blue | — | — | 0.30 | — | — | — | 0.30 | — |
| Perylene blue | — | — | — | 0.30 | — | 0.30 | — | 0.30 |

[Note] *weight parts to 100 wt. parts of hard polyvinyl chloride.

TABLE 11

| Example No. | Temperature (°C.) | L* | a* | b* | ΔE* |
|---|---|---|---|---|---|
| Comparative | 25 | 63.60 | 42.89 | 48.00 | — |
| Example 11 | 40 | 63.22 | 42.78 | 47.37 | 0.75 |
|  | 50 | 62.96 | 42.71 | 46.94 | 1.25 |
| Comparative | 25 | 63.26 | 34.65 | 32.16 | — |
| Example 12 | 40 | 63.02 | 34.42 | 31.65 | 0.61 |
|  | 50 | 62.86 | 34.26 | 31.31 | 1.01 |
| Comparative | 25 | 61.54 | 24.63 | 23.77 | — |
| Example 13 | 40 | 61.39 | 23.74 | 23.47 | 0.95 |
|  | 50 | 61.30 | 23.14 | 23.28 | 1.58 |
| Comparative | 25 | 69.37 | 32.00 | 47.35 | — |
| Example 14 | 40 | 69.42 | 32.00 | 47.30 | 0.07 |
|  | 50 | 69.43 | 32.00 | 41.27 | 1.11 |
| Comparative | 25 | 62.80 | 45.08 | 42.98 | — |
| Example 15 | 40 | 62.42 | 44.83 | 42.23 | 0.88 |
|  | 50 | 62.16 | 44.66 | 41.72 | 1.47 |
| Comparative | 25 | 64.04 | 36.01 | 12.59 | — |
| Example 16 | 40 | 63.85 | 35.41 | 12.10 | 0.80 |
|  | 50 | 63.73 | 35.00 | 11.77 | 1.34 |
| Comparative | 25 | 62.91 | 38.11 | 0.83 | — |
| Example 17 | 40 | 62.99 | 38.12 | 0.86 | 0.09 |
|  | 50 | 63.04 | 38.12 | 0.89 | 0.14 |
| Comparative | 25 | 69.71 | 34.08 | 34.48 | — |
| Example 18 | 40 | 69.79 | 33.93 | 34.56 | 0.19 |
|  | 50 | 69.85 | 33.83 | 34.62 | 0.32 |

Examples 13–20

The observed value of spectral reflectance at each temperature level obtained in each of the Comparative Examples 11–18 was used to estimate the values at 40° C. and 50° C. on the basis of observed value at 25° C. using the correction factor of the base pigment per 1° C., which correction factor had been entered into the computer as the database for each wavelength. The estimated value and the computed value of ΔE* at each temperature are listed in Table 12.

Comparison of the color difference (ΔE) in Table 12 with the corresponding color difference (ΔE) given in Table 11 indicates that the error in the Examples decreases for every value at each temperature level and that both values agree in Examples with little error.

TABLE 12

| Example No. | Temperature (°C.) | L* | a* | b* | ΔE* |
|---|---|---|---|---|---|
| Example 13 | Estimated value at 40° C. | 63.22 | 42.66 | 47.23 | 0.18 |
|  | Estimated value at 50° C. | 62.96 | 42.60 | 46.81 | 0.18 |
| Example 14 | Estimated value at 40° C. | 63.12 | 34.40 | 31.66 | 0.10 |

TABLE 12-continued

| Example No. | Temperature (°C.) | L* | a* | b* | ΔE* |
|---|---|---|---|---|---|
|  | Estimated value at 50° C. | 62.96 | 34.24 | 21.33 | 0.10 |
| Example 15 | Estimated value at 40° C. | 61.41 | 23.02 | 23.10 | 0.47 |
|  | Estimated value at 50° C. | 61.31 | 23.42 | 22.89 | 0.48 |
| Example 16 | Estimated value at 40° C. | 69.41 | 32.10 | 47.50 | 0.23 |
|  | Estimated value at 50° C. | 69.43 | 32.10 | 47.46 | 0.22 |
| Example 17 | Estimated value at 40° C. | 62.35 | 44.88 | 42.22 | 0.08 |
|  | Estimated value at 50° C. | 62.07 | 44.71 | 41.71 | 0.09 |
| Example 18 | Estimated value at 40° C. | 63.85 | 35.46 | 12.04 | 0.08 |
|  | Estimated value at 50° C. | 63.73 | 35.05 | 11.72 | 0.07 |
| Example 19 | Estimated value at 40° C. | 63.05 | 38.05 | 0.87 | 0.09 |
|  | Estimated value at 50° C. | 63.10 | 38.05 | 0.90 | 0.09 |
| Example 20 | Estimated value at 40° C. | 69.87 | 33.96 | 34.57 | 0.09 |
|  | Estimated value at 50° C. | 69.93 | 33.76 | 34.62 | 0.10 |

Example 21

Sample sheets of polystyrene colored by 0.5% addition of perylene dye (plasto-red 8315, made by Arimoto Kagaku Kogyo Co., Ltd.) were prepared by an injection molding process. The spectral reflectance was measured at 58° C. and 25° C. The color difference (ΔE) computed from the observed values was 2.3. Following the same procedure as for Examples 13–20, the spectral reflectance was measured at 58° C. at each wavelength, and the observed value was corrected by computing the spectral transmittance at 25° C. using the predetermined change (ΔD) per 1° C. Comparison of the corrected value and the color difference (ΔE) observed at 25° C. showed the difference was 0.06, which is negligibly small.

As described above, the present invention suppresses the dispersion of observed values caused by temperature change during color measurement, which dispersion was a disadvantage of the prior art, using a simple operation for correcting spectral reflectance, and allows the digitizing of observed values in applying CCM and in the color control of colored material, even if a temperature change occurs in each measurement cycle. Consequently, for determining the mixing rate of a base dye or pigment for example, the optimum mixing rate is selectable at an arbitrary temperature level. For the numerical control of color, a measurement at an arbitrary temperature can readily be corrected to the value at a specific temperature if only the specific temperature is allotted. As a result, there is no need to remeasure the standard sample for every measurement and no need to store and monitor the standard sample. Thus the method of quality control of the hue is significantly improved.

We claim:

1. A method for determining the colorimetric value of a colored material comprising the steps of:

measuring the spectral reflectance or transmittance of a sample colored material at at least two different temperatures with a spectrophotometer;

calculating a correction factor for the spectral reflectance or transmittance based on the change in spectral reflectance or transmittance in a temperature range between the at least two different temperatures;

measuring the spectral reflectance or transmittance of the colored material at an arbitrary temperature using a spectro-photometer;

calculating the spectral reflectance or transmittance of the colored material at a predetermined temperature by modifying the measured spectral reflectance or transmittance of the colored material with the correction factor; and predicting the colorimetric value of the colored material at the predetermined temperature utilizing the calculated spectral reflectance or transmittance.

2. A method for determining the colorimetric value of a colored material comprising the steps of:

measuring the spectral reflectance of a sample colored material at at least two different temperatures with a spectro-photometer;

calculating absorption and scattering coefficients for different wavelengths in a temperature range between the at least two different temperatures;

calculating correction factors for the absorption and scattering coefficients based on the change in absorption and scattering coefficients for the different wavelengths in the temperature range;

correcting the measured spectral reflectance of the sample colored material utilizing the correction factors for the absorption and correction coefficients;

calculating the spectral reflectance of the sample material at a predetermined temperature utilizing the corrected measured spectral reflectance;

and predicting the colorimetric value of the sample material at the predetermined temperature utilizing the calculated spectral reflectance of the sample material.

3. A method for determining the colorimetric value of a colored material comprising the steps of:

measuring the spectral transmittance of a sample colored material at at least two different temperatures with a spectrophotometer;

calculating the absorbance for different wavelengths in a temperature range between the at least two different temperatures;

calculating a correction factor based on the change in absorbance for the different wavelengths in the temperature range;

correcting the measured spectral reflectance of the sample colored material utilizing the correction factor based on the change in absorbance;

calculating the spectral reflectance of the sample material at a predetermined temperature utilizing the corrected measured spectral reflectance; and predicting the colorimetric value of the sample material at the predetermined temperature utilizing the calculated spectral reflectance of the sample material.

4. The method of claim 1, wherein said materials are synthetic resin materials or painted metallic materials.

5. The method of claim 1, wherein said materials are colored by at least one compound selected from the group consisting of anthraquinone dyes, heterocyclic compound dyes, methine dyes, perynone dyes, perylene dyes, titanium dioxide pigments, carbon black pigments, iron oxide pigments, ultramarine pigments, azo pigments, copper phthalocyanine pigments, perynone pigments, perylene pigments, quinacridone pigments and pyrrole pigments.

6. The method of claim 1, where the colorimetric value is expressed by a Munsell value according to the Munsell color system or by L*, a* and b* according to the CIE standard colorimetric system.

7. The method of claim 1, wherein the method is used for color control in computer matching.

8. The method of claim 1, wherein the method is used for color control of a naturally occurring substance.

* * * * *